(12) United States Patent
Troia et al.

(10) Patent No.: US 11,902,419 B2
(45) Date of Patent: Feb. 13, 2024

(54) ERROR DETECTION (71) Applicant: Renesas Electronics America Inc., Milpitas, CA (US)

(72) Inventors: Alberto Troia, Dusseldorf (DE); Serge Di Matteo, Dusseldorf (DE)

(73) Assignee: Renesas Electronics America Inc., Milpitas, CA (US)

(*) Notice: Subject to any disclaimer, the term of this patent is extended or adjusted under 35 U.S.C. 154(b) by 469 days.

(21) Appl. No.: 17/172,173

(22) Filed: Feb. 10, 2021

(65) Prior Publication Data
US 2021/0266146 A1 Aug. 26, 2021

(30) Foreign Application Priority Data

Feb. 26, 2020 (EP) .................................. 20159646

(51) Int. Cl.
*H04L 9/06* (2006.01)
*G06F 11/10* (2006.01)
*G06F 13/42* (2006.01)
*H04N 7/18* (2006.01)

(52) U.S. Cl.
CPC ........ *H04L 9/0643* (2013.01); *G06F 11/1004* (2013.01); *G06F 13/4282* (2013.01); *H04L 2209/12* (2013.01); *H04N 7/183* (2013.01)

(58) Field of Classification Search
CPC .............. H04L 9/0643; H04L 2209/12; G06F 11/1004; G06F 13/4282; H04N 7/183
USPC ......................................................... 380/28
See application file for complete search history.

(56) References Cited

U.S. PATENT DOCUMENTS

| | | | | |
|---|---|---|---|---|
| 10,162,967 B1* | 12/2018 | Oliver | .................... | H04L 63/145 |
| 2003/0198342 A1* | 10/2003 | Condorelli | ............ | H04L 9/0643 380/37 |
| 2007/0127464 A1* | 6/2007 | Jain | .......................... | H04L 41/24 370/389 |
| 2009/0262925 A1* | 10/2009 | Vijayarangan | ........ | H04L 9/0643 380/29 |
| 2014/0330994 A1* | 11/2014 | Mishra | .................. | H04L 7/0037 710/105 |
| 2019/0190893 A1 | 6/2019 | Troia et al. | | |
| 2020/0045540 A1* | 2/2020 | Hutchison | ............... | H04W 4/38 |

FOREIGN PATENT DOCUMENTS

EP 3447528 A1 2/2019

OTHER PUBLICATIONS

Extended European Search Report dated Sep. 16, 2020 received in European Patent Application No. EP 20159646.7.
Office Action dated Feb. 1, 2023 received in European Patent Application No. EP 20159646.7.

* cited by examiner

*Primary Examiner* — Dant B Shaifer Harriman
(74) *Attorney, Agent, or Firm* — SCULLY, SCOTT, MURPHY & PRESSER, P.C (57) ABSTRACT

A data transmitter is disclosed. The data transmitter includes a digest generator configured in response to receiving a set of data from a data source to generate a digest from the set of data using a cryptographic primitive. The data transmitter further includes a packet generator configured to generate a series of one or more packets carrying the set of data for transmission, wherein each packet in the series includes a header, the set of data, a footer and the digest.

8 Claims, 8 Drawing Sheets

ERROR DETECTION

CROSS-REFERENCE TO RELATED APPLICATIONS

The subject application claims priority to European Patent Application No. EP20159646.7, filed on Feb. 26, 2020. The entire disclosure of European Patent Application No. EP20159646.7 is incorporated by this reference.

BACKGROUND

Field

The present invention relates to error detection.

Description of Related Art

Motor vehicles increasingly are being equipped with multiple sensor systems capable of feeding live data which can be used to assist a driver of a vehicle while driving or parking. For example, use cases include cameras, LiDAR, RADAR, ultrasound and infrared systems for road sign and/or obstacle detection, road lane detection, parking lane markers, pedestrian detection and the like. LiDAR systems may use the Mobile Industry Processor Interface Camera Serial Interface (MIPI-CSI), for example, MIPI-CSI2, as high speed protocol to send acquisition data to the controller connected. High speed transmissions, such as those in LiDAR applications can have errors showing in the data transmitted. Protocols such as a cyclic redundancy check 16 (CRC16) may be implemented, but the transmission is still prone to errors.

The implementation of Comité Consultatif International Téléphonique et Télégraphique (CCITT) CRC16 makes the error detection coverage of the transmitted data packet more robust with respect to the probability of undetected failures. However, a more robust system does not imply error free, and data containing errors can still be received by a receiver and processed further.

SUMMARY

According to a first aspect of the present invention there is provided a data transmitter. The data transmitter comprises a digest generator configured in response to receiving a set of data from a data source, to generate a digest from the set of data using a cryptographic primitive. The data transmitter further comprises a packet generator configured to generate a series of one or more packets carrying the set of data for transmission, wherein each packet in the series includes a header, the set of data, a footer and the digest.

The data source may be a sensor for capturing image and/or range data, for example, a lidar sensor.

The data transmitter may further comprise an acquisition and quantization module configured to acquire and quantize data from the sensor.

The cryptographic primitive may be a hash function.

The packet generator may be configured to generate an error-detecting code for each respective packet and to include the error-detecting code in the packet. The packet generator may be further configured to provide the error-detecting code to the digest generator. The digest generator may be configured to generate the digest from the set of data and the error-detecting code(s) for each respective packet.

The packet generator may be configured to position the digest between footer and the set of data.

The packet generator may conform to a Mobile Industry Processor Interface Camera Serial Interface specification.

The digest generator and packet generator may be implemented in hardware.

The transmitter may be comprised within an integrated circuit.

According to a second aspect of the invention, there is provided a data receiver. The data receiver comprises a digest generator, a digest comparator and a data processor. The data receiver further comprises a packet receiver configured in response to receiving a series of one or more packets carrying a set of data and a remotely-generated digest of the set of data generated using a cryptographic primitive, to extract the set of data and to forward the set of data to the digest generator and to the data processor, and to extract the remotely-generated digest and to forward the remotely-generated digest to the digest comparator. The digest generator is configured in response to receiving the set of data from the packet receiver to generate a locally-generated digest from the set of data using the same cryptographic primitive used to generate the remotely-generated digest and to forward the locally-generated digest to the digest comparator. The digest comparator is configured to compare the remotely-generated digest and the locally-generated digest and to signal to the data processor whether the remotely-generated digest and the locally-generated digest are the same or different so as to indicate an absence or presence respectively of a transmission error.

The data receiver may be a microcontroller or system-on-a chip.

According to a third aspect of the invention, there is provided a system comprising a data bus, the transmitter and the receiver. The data transmitter is operatively connected to the data bus. The data receiver is operatively connected to the data bus.

According to an fourth aspect of the invention there is provided a vehicle comprising the system. The vehicle may be a motor vehicle.

According to a fifth aspect of the invention there is provided a method for generating a digest and a packet comprising the digest. The method comprises generating a digest from a set of data using a cryptographic primitive. The method further comprises generating a series of one or more packets carrying the set of data for transmission, wherein each packet in the series includes a header, the set of data, a footer and the digest.

According to a sixth aspect of the invention there is provided a method for validating data. The method comprises extracting a set of data from a series of one or data packets. The method comprises extracting a remotely-generated digest generated using a cryptographic primitive from the one or more data packets. The method comprises generating a locally-generated digest from the set of data using the same cryptographic primitive. The method further comprises comparing the remotely-generated digest and the locally-generated digest. The method further comprises signalling whether the remotely-generated digest and the locally-generated digest are the same or different so as to indicate an absence or presence of a transmission error.

According to a seventh aspect of the invention, there is provided a computer program comprising instructions which, when executed by at least one processor, causes the at least one processor to perform the method for generating a digest and a packet comprising the digest and/or validating data.

According to a eighth aspect of the present invention is provided a computer program product comprising a computer readable medium (which may be non-transitory) storing the computer program.

BRIEF DESCRIPTION OF THE DRAWINGS

Certain embodiments of the present invention will now be described, by way of example, with reference to the accompanying drawings, in which.

DETAILED DESCRIPTION

System Overview

Figure 1:
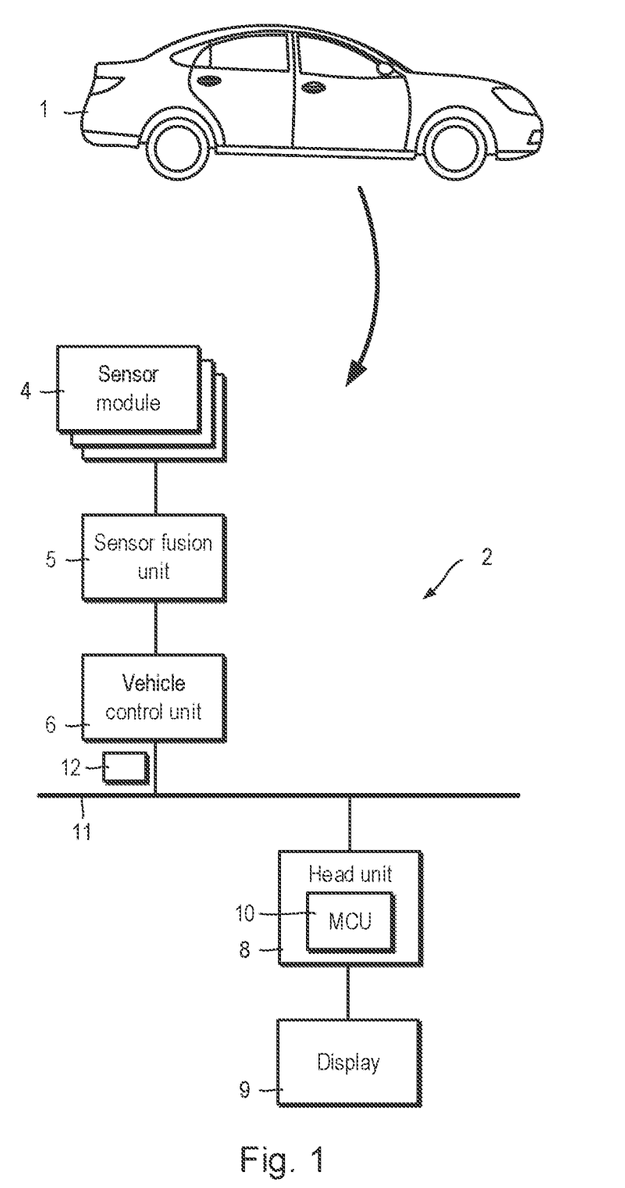
FIG. 1 illustrates a motor vehicle which includes a driver assistance system.

Referring to FIG. 1, a motor vehicle 1 is shown.

The motor vehicle 1 includes an advanced driver assistance system 2. Advanced driver assistance systems are systems which help a driver during driving or parking, for example, by warning the driver when they are close to objects, or when they are straying from a lane on a road.

The system 2 includes one or more sensor modules 4, a sensor fusion unit 5, and a vehicle control unit 6. Sensor modules 4 may be, for example, LiDAR, Radar, camera, ultrasound or infrared systems and the like. The system 2 may include multiple sensor modules 4 of different types, for example, the system 2 may include multiple camera sensor modules and also multiple LiDAR sensor modules. The system 2 further includes a head unit 8 and, optionally, a display 9. The head unit 8 is an information and/or entertainment component providing a unified hardware interface for the system 2. The head unit 8 further includes a microcontroller 10. The vehicle control unit 6 and head unit 8 are connected to an in-vehicle communications bus 11. The in-vehicle communications bus 11 may be, for example, a communication bus, a Controller Area Network (CAN) interface, FlexRay, Media Oriented System Transport (MOST) interface, Auto-Ethernet, or PCI-Express. The bus 11 receives data 12 from the vehicle control unit 6 and sends data 12 to the microcontroller 10. The sensor fusion unit 5 receives validated data from one or more sensor modules 4 and merges the data. This merged data is then transferred to the vehicle control unit 6 which can make decisions on vehicle control in response to data received from the sensor fusion unit 5.

Sensor Module

Figure 2:
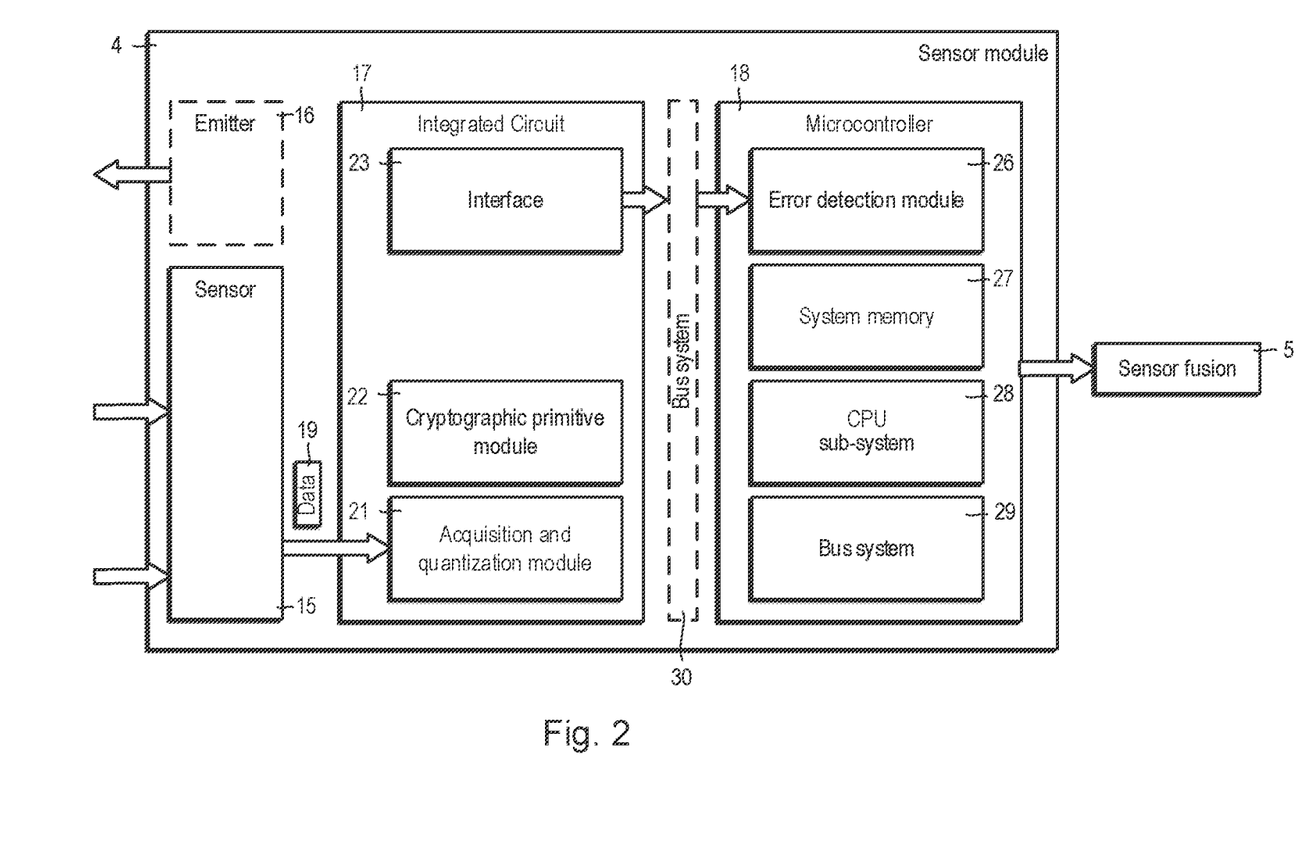
FIG. 2 is a first schematic block diagram of a sensor module.

Referring to FIG. 2, the sensor module 4 includes a sensor 15, and may optionally include an emitter 16. The sensor module 4 further includes an integrated circuit 17 and a microcontroller 18. The sensor 15 included in the sensor module 4 will depend on the type of sensor module 4, for example if the sensor module 4 was a LiDAR sensor module the sensor 15 would be one or more photo-receivers (e.g. photodiodes) and the emitter 16 would be one or more lasers. The sensor 15 may be, for example, one of a camera, a thermometer, an altimeter, a hygrometer, a microphone, Radar, ultrasound or infrared and the like. The sensor 15 receives inputs from the environment, for example through ambient light reflected off an object (not shown) onto a camera sensor, or from a laser emitted from the emitter 16 reflected off an object (not shown) and onto the photodiode. The sensor 15 transmits data 19 from this input to the integrated circuit 17 which may be an Application Specific Integrated Circuit (ASIC), for example, a LiDAR ASIC. The integrated circuit 17 includes an acquisition and quantization module 21, a cryptographic primitive module 22 and an interface 23. The interface 23 may be, for example, a Mobile Industry Processor Interface (MIPI). As will be explained in more detail later, the acquisition and quantization module 21 of the integrated circuit 17 acquires and quantizes data 19 from the sensor 15, passes the data 19 to the cryptographic primitive module 22 and passes the quantized and processed data to a microcontroller 18 via the interface 23. The microcontroller 18 includes an error detection module 26, system memory 27, a CPU subsystem 28 which includes a CPU (not shown) and a bus system 29. As will be explained in more detail later, the microcontroller 18 analyses and verifies the data 19 using the error detection module 26 and forwards the verified data 19 for further processing and/or transmission to a sensor fusion unit 5. Optionally, the sensor module 4 may include a bus system 30 to connect the integrated circuit 17 to the microcontroller 18. In some embodiments, the interface 23 of the integrated circuit 17 is connected to the microcontroller 18.

Sensor Module Integrated Circuit

Figure 3:
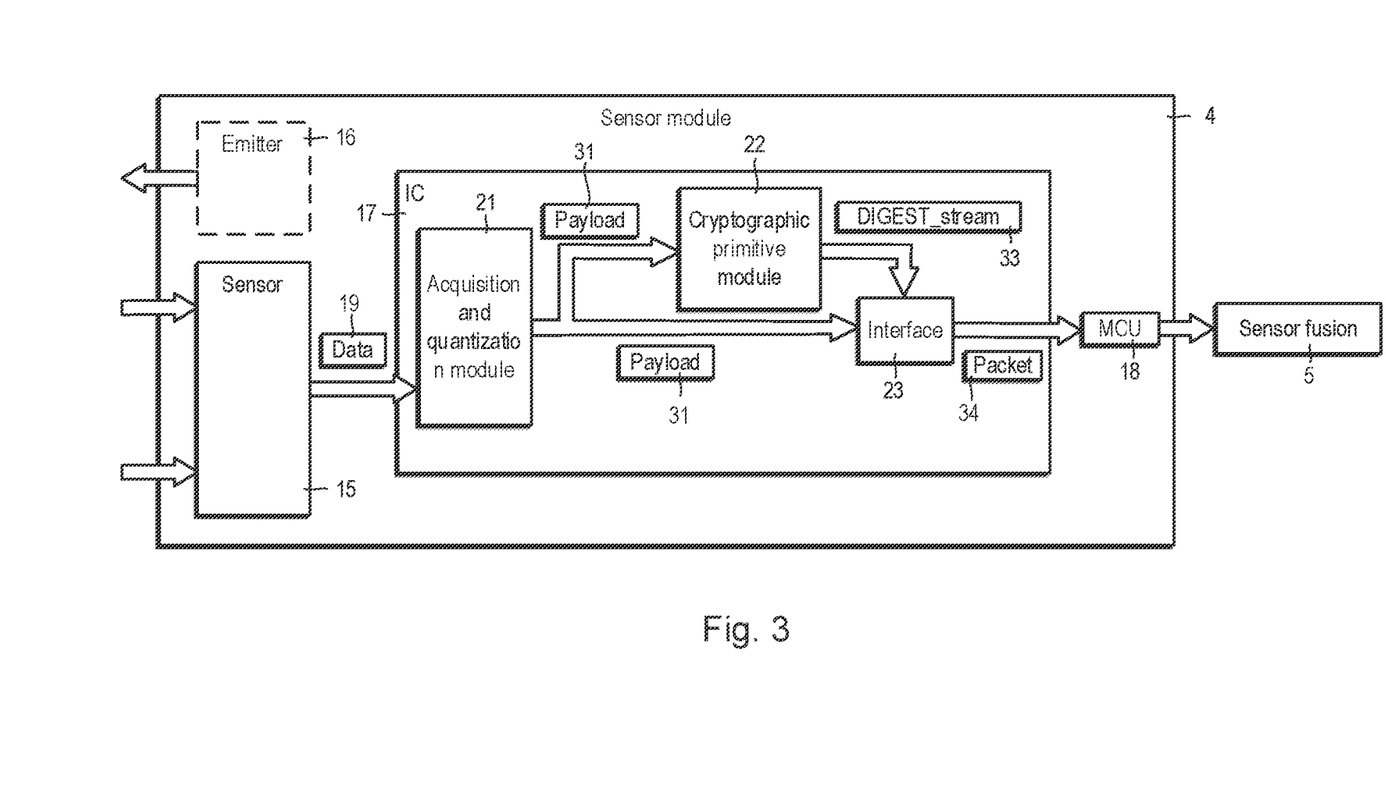
FIG. 3 is a second schematic block diagram of the sensor module in FIG. 2.

Referring to FIG. 3, the sensor 15 senses the environment (for example, by receiving reflected laser emissions from an emitter 16, or by receiving an image on a camera sensor), and generates a set of data 19 from the information received. Each set of data 19 received is a sampling event. The set of data 19 is transmitted from the sensor 15 to the integrated circuit 17. When the data 19 is received by the integrated circuit 17 it enters the acquisition and quantization module 21 where the data 19 is sampled and quantized. The acquisition and quantization module 21 generates a stream of data 31 (herein also referred to as a "payload") which is sent to both the message digest generating module 25 and the interface 23.

Figure 4:
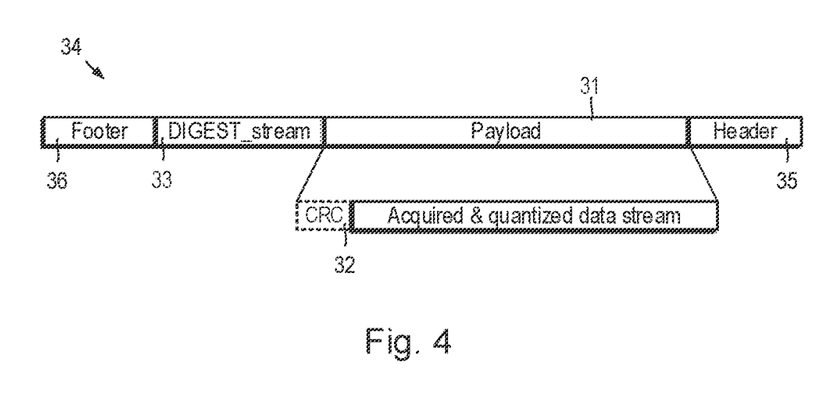
FIG. 4 is a schematic diagram of a packet.

Referring also to FIG. 4, the payload 31 may also include error detecting code 32 such as a cyclic redundancy check (CRC), for example, the output from a CRC32 algorithm. If the payload 31 does not include error detecting code 32, the quantized data stream forms the payload 31. The payload (herein also referred to as a "message") is then sent to the cryptographic primitive module 22 which generates a message digest 33 (herein also referred to as a "digest", or "DIGEST_stream") using a cryptographic primitive, for example, a cryptographic hash function. A cryptographic hash function is a mathematical algorithm that generates a bit string of a fixed size from data (i.e. a "message") of an arbitrary size. It is a one-way function, that is, it a function that is difficult to invert, meaning that the message cannot be generated form the message digest. Preferably, the cryptographic primitive is deterministic, that is, that the same digest is generated for a given message each time. Preferably, it is infeasible to find two different messages with the same hash value. The message digest can therefore act in a similar way to a human fingerprint, allowing the identification of the message from the message digest.

The algorithm used in the cryptographic primitive module 22 may be, for example, a Secure Hash Algorithm (e.g. SHA-2, SHA256 etc.), an Advanced Encryption Standard (AES), a Data Encryption Standard (DES) and the like. The message digest 33 may be, for example, a one-way hash, but other suitable message digests 33 may be used. Message digests 33 may also be combined. The size of the message digest 33 depends on the cryptographic primitive used, for example, the SHA-256 has a message digest result of 256 bits.

The message digest 33 is appended to the payload 31 and then both are sent to the interface 23. The interface 23 generates a packet 34 which includes a header 35, a payload 31, the DIGEST_stream 33 generated from the payload 31 and a footer 36. The interface 31 then sends the packet 34 to the sensor module microcontroller 18. The payload 31 may have any suitable minimum length, and a maximum length of $(2^{64}-1)/8$ bytes.

The DIGEST_stream 33 may be positioned after the payload 31 in the packet 34, that is, between the payload 31 and the footer 36. As will be explained in more detail later, positioning the DIGEST_stream 33 after the payload 31 may help to optimize the performance of the sensor module 4. The payload 31 in the packet 34 can be closed-ended or open-ended if the interface 23 is an MIPI. Alternatively, if the interface 23 is a serial flash, the read can be open-ended. During an open-ended transmission, the size of the data being received is not known before the act of receiving it starts and the data stops being received when the microcontroller 18 closes the communication. For example, a continuous burst mode of data, e.g. software for configuring a Field-programmable gate array (FPGA), the final byte of the configuration data is not known. In a closed-ended close-ended transmission, the size of the packet is defined before being received. For example, for MIPI-CSI2 8 KB packets, it is known in advance when the last byte will arrive.

Other commands have lengths depending on the command purpose, for example, a configuration command, e.g. writing a register with a content, can have a reduced length in the address size and in the data size. Another example would be a reset command which may be without arguments. Such a command may happen in the Serial Peripheral Interface (SPI) protocol where the transmission is closed when the chip select signal changes polarity; this is the edge where the bits are converted in instruction and the argument, if present, is taken in consideration.

Sensor Module Microcontroller

Figure 5:
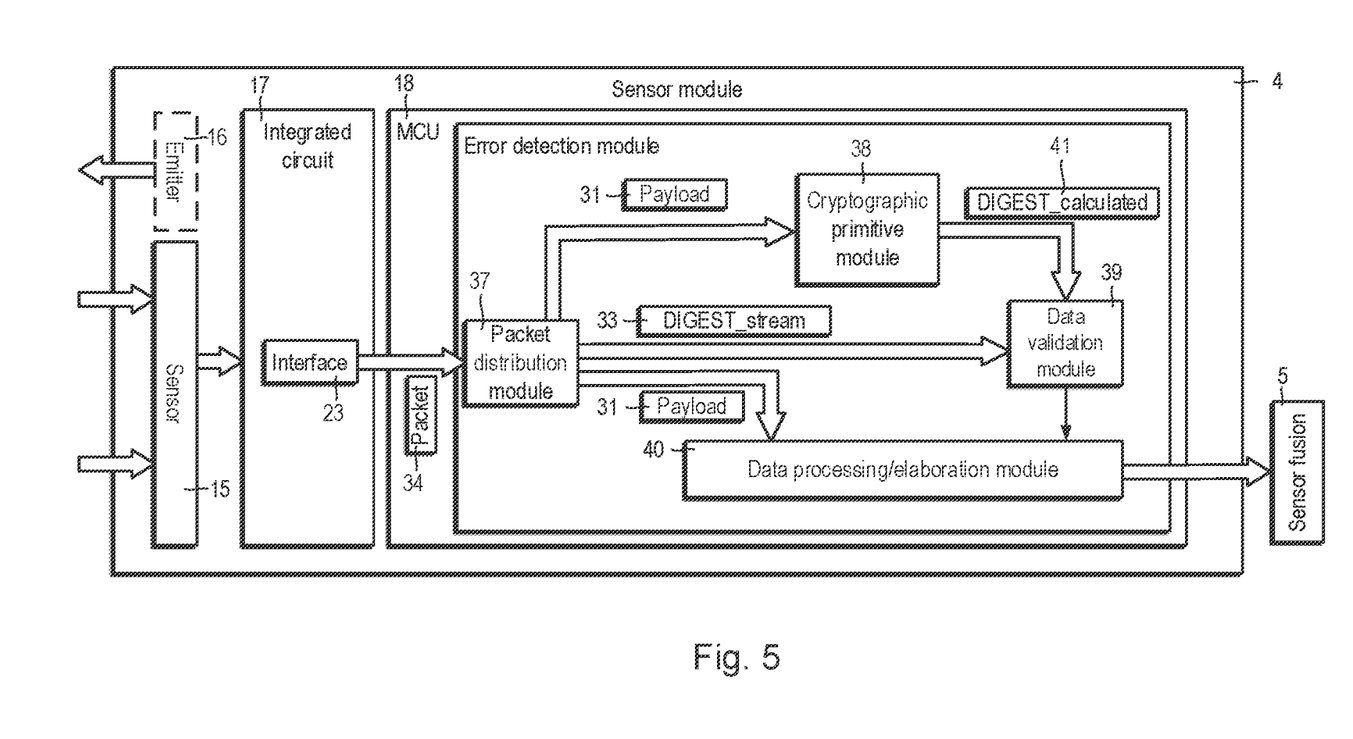
FIG. 5 a third schematic block diagram of the sensor module in FIG. 2.

Referring to FIG. 5, error detection module the sensor module 26 of the microcontroller 18 includes a packet receiving and packet distribution module 37 for distributing packets 34 and a message digest generating module 38. The microcontroller 18 further includes a data validation module 39 (herein also referred to as a 'digest comparator'), and a data processing and/or elaboration module 40.

The packet receiving and packet distribution module 37 receives a packet from the sensor module interface 23 included in the integrated circuit 17. The sensor module microcontroller 18 extracts the payload 31 and DIGEST_stream 33 from the packet 34. The packet receiving and packet distribution module 37 sends the payload 31 to the data processing and/or elaboration module 40 and to the microcontroller message digest generating module 38. As will be explained in more detail later, the payload 31 may not be processed further until the payload 31 is validated. The DIGEST_stream 33 is sent to the validation module 39.

The microcontroller message digest generating module 38 generates a message digest 41 (herein also referred to as a "digest", or "DIGEST_calculated") from the payload 31 using the same algorithm as the integrated circuit cryptographic primitive module 22. The DIGEST_calculated 41 is then sent to the validation module 39.

DIGEST_calculated 41 is calculated by the microcontroller message digest generating module 34 as it receives and extracts the payload 31 from the interface 23, in other words, the DIGEST_calculated 41 is calculated "on the fly" as the microcontroller 18 received the packet 34. This means that the DIGEST_calculated 41 is generated as the DIGEST_ stream 33 is received by the validation module 39. This allows for the DIGEST_calculated 41 and DIGEST_ stream 33 to be compared as soon as the DIGEST_ calculated 41 is generated, reducing the overheads required for transmitting and/or storing the DIGEST_calculated 41 and/or the DIGEST_stream 33.

The validation module 39 then compares the DIGEST_stream 33 with the DIGEST_calculated 41. If DIGEST_stream 33 and DIGEST_calculated 41 do not match, the payload 31 sent to the data processing and/or elaboration module 40 is discarded and/or retransmitted and/or other counter measures will be undertaken by the microcontroller 18 and/or by the sensor fusion unit 5, providing the vehicle 1 driver with the correct data 12 and/or communication. If DIGEST_stream and DIGEST_calculated match, this indicates that the payload 31 received by the sensor module integrated circuit 17 from the sensor 15 and the payload 31 received by the sensor module microprocessor 18 are the same and free from errors, the payload 31 is therefore validated. A validated payload 31 can then be used for further data processing and/or data elaboration and/or transmitted to the sensor fusion unit 5. Examples of further data processing or data elaboration are communication to the vehicle control unit 6 and/or sensor fusion unit 5 of processed data to recognize, for example, obstacles, road lines, vertical and horizontal road indications, etc.

Figure 6:
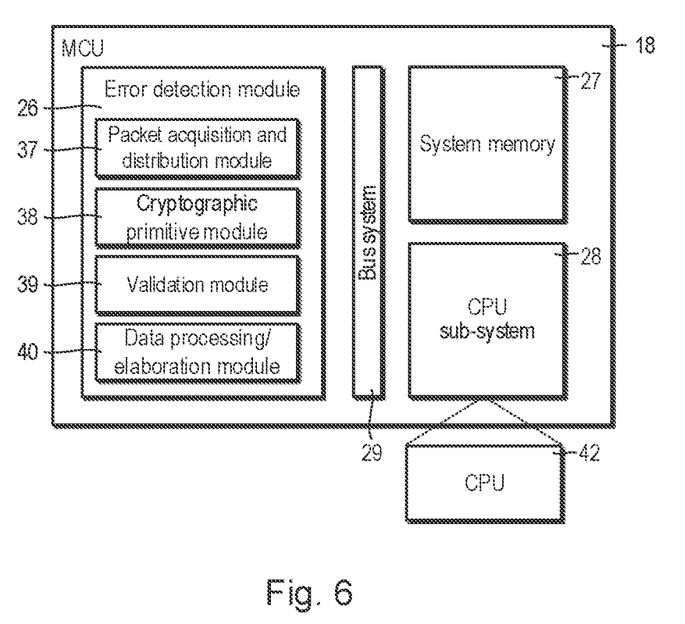
FIG. 6 a schematic block diagram of a microprocessor on the a sensor module shown in FIG. 2.

Referring to also to FIG. 6, the payload 31, DIGEST_stream 33, DIGEST_calculated 41 and/or digest generating code may be stored in the system memory 27. In some embodiments, the computation of the digest may be performed by the CPU 42 of the CPU subsystem 28. The packet acquisition and distribution module 37, cryptographic primitive module 38, validation module 39 and data processing and/or elaboration module 40 may be peripheral modules.

The microcontroller 18 may include other peripheral modules (not shown), such as other communications network controllers (for other different types of communications network), timers and the like.

High-Speed Data Transmission

Errors may be injected into data 19 in high-speed transmission mode. The probability of errors occurring ($P_{err}$) is symmetric (i.e. $P_{err}(0 \rightarrow 1) = P_{err}(1 \rightarrow 0) = 0.5$). The Bit Error Rate (BER) is the likelihood of a bit misinterpretation due to electrical noise and is independent on high-speed data communications physical layer standard (MIPI-PHY) configuration. BER is caused by system level induced (Gaussian) noise and, in the case of a LiDAR sensor module, is typically lower than $10^{-4}$. The BER varies depending on the sensor module type and configuration. The CCITT 16 bit-CRC (0x8810) is used for "failsafe" error detection, according to MIPI-CSI2 standard.

Assuming N=number of bits for a given data payload 31, and BER=Bit Error Rate, the Payload Error Probability (PEP) can be expressed by:

$$PEP = 1 - (1-BER)^N \quad (1)$$

The LiDAR operating modes and related data bandwidths may be, for example, as follows:
  2D-Flash (2DF)→24.3 Mbps
  3D-Flash (3DF)→387.6 Mbps
  3D-Mirror (3DM)→2,960 Mbps The bandwidths may be higher or lower depending on the architecture of the LiDAR.

In the case where there are no error correction codes, every (detected) bit error in the data payload implies the re-transmission of the entire data payload 31. Therefore, the PEP may result in a loss of data bandwidth performance. In other words the theoretical data bandwidth in absence of noise ($BW_{NOM}$; i.e. where BER=0), the effective data bandwidth ($BW_{EFF}$) as resulting in case of BER≠0, is expressed by:

$$BW_{EFF}=BW_{NOM}\times(1-PEP) \quad (2)$$

Notably, the effective data bandwidth is independent on the error detection strategy.

The error-correcting code (ECC) allows 1-bit error correction and 2-bit detection. Therefore, the estimation of undetected errors in the short packets can be performed by considering the safe communication cases, as follows:
  No bit errors (i.e. Correct Message)→Pr(no error)
  One bit error (i.e. Corrected Message→Pr (one error)
  Two bit errors (i.e. Incorrect Message)→Pr (two errors)
These probabilities can be expressed as follows:

$$Pr_{(no\ error)}=(1-BER)^N$$

$$Pr_{(one\ error)}=N\times BER\times(1-BER)^{N-1}$$

$$Pr_{(two\ errors)}=0.5\times N\times(N-1)\times BER^2\times(1-BER)^{N-2}$$

Therefore, the upper bound (i.e. worst case) of the probability of undetected errors $P_{ud}$ can be expressed by:

$$P_{ud} = 1 - Pr_{(no\ error)} - Pr_{(one\ error)} - Pr_{(two\ errors)} = (1-BER)^N - \quad (3)$$
$$N\times BER\times(1-BER)^{N-1} - 0.5\times N\times(N-1)\times BER^2\times(1-BER)^{N-2}$$

The probability of having three or more bit errors in a one short packet is given by:

TABLE 1

| BER | $P_{ud}$ Upper bound |
| --- | --- |
| $10^{-4}$ | $2.33\times10^{-10}$ |
| $10^{-5}$ | $2.33\times10^{-10}$ |
| $10^{-6}$ | $2.33\times10^{-10}$ |
| $10^{-7}$ | $4.79\times10^{-12}$ |
| $10^{-8}$ | $4.80\times10^{-16}$ |

Notably, not all bit error combinations higher than two are undetected by ECC. Therefore, this justifies the definition of $P_{ud}$ as the upper bound probability of undetected errors. As such, it can be considered a conservative estimation of safety critical failures. The related conversion in failure rate (FIT) depends on the number of short packets transmitted per hour.

A long packet data stream consists of three elements: a 32-bit packet header (PH), an application specific data payload with a variable number of 8-bit data words, and a 32-bit packet footer (PF). Both the header and the footer are short packets. The 16-bit payload of the header 31 is typically the words counter of the central bulk data payload. The 16-bit payload of the footer is typically the CRC of the central bulk data payload. Thus the 16-bit CRC of the bulk data, as limited to 8 KB according to CRC, is protected by a dedicated 8-bit ECC.

The standard CRC used for the bulk data is CRC16-CCITT (0x8810). The CRC16-CCITT can detect all single and double bit errors (Hamming distance (HD)=3), all three errors up to 32,751 data bit (HD=4), all errors with an odd number of bits, all burst errors of length 16 or less, 99.997% of 17-bit error bursts and/or 99.998% of 18-bit and longer bursts.

Table 2 shows the BER for different sizes of payload.

TABLE 2

| BER | 1 Kbyte | 2 Kbyte | 4 Kbyte | 8 Kbyte |
| --- | --- | --- | --- | --- |
| $1\times10^{-10}$ | 0% | 0% | 0% | 0% |
| $1\times10^{-9}$ | 0% | 0% | 0% | 0.01% |
| $1\times10^{-8}$ | 0.01% | 0.02% | 0.03% | 0.07% |
| $1\times10^{-7}$ | 0.08% | 0.16% | 0.33% | 0.65% |
| $1\times10^{-6}$ | 0.82% | 1.63% | 3.22% | 6.34% |
| $1\times10^{-5}$ | 7.87% | 15.11% | 27.94% | 48.07% |
| $1\times10^{-4}$ | 55.92% | 80.57% | 96.23% | 99.86% |

There is therefore a high probability of errors occurring in the high-speed communication using the MIPI interface. The CRC-32 can reduce the probability of errors being undetected. However, the CRC-32, and other error detection methods use the Hamming distance to measure the power of error detection and eventual error correction.

The present application uses the probability that two different digests are equal, when an error occurs in the same stream generating the digest. Message digests, for example, SHA256, are very robust against errors. For example, the probability that DIGEST_stream 33 and DIGEST_calculated 41 will be the same in the presence of one or more bit errors is $4.3\times10^{-60}$ Such a method may reduce the probability of collisions, that is, in this case, where the microcontroller 18 verifies the payload 31 received from the sensor module 4 which contain errors. In other words, generating the DIGEST_stream 33 and the DIGEST_calculated 41 and comparing the two to determine whether they match or not reduces the probability of not detecting errors in the transmission of data.

Message Digest Generation

Figure 7:
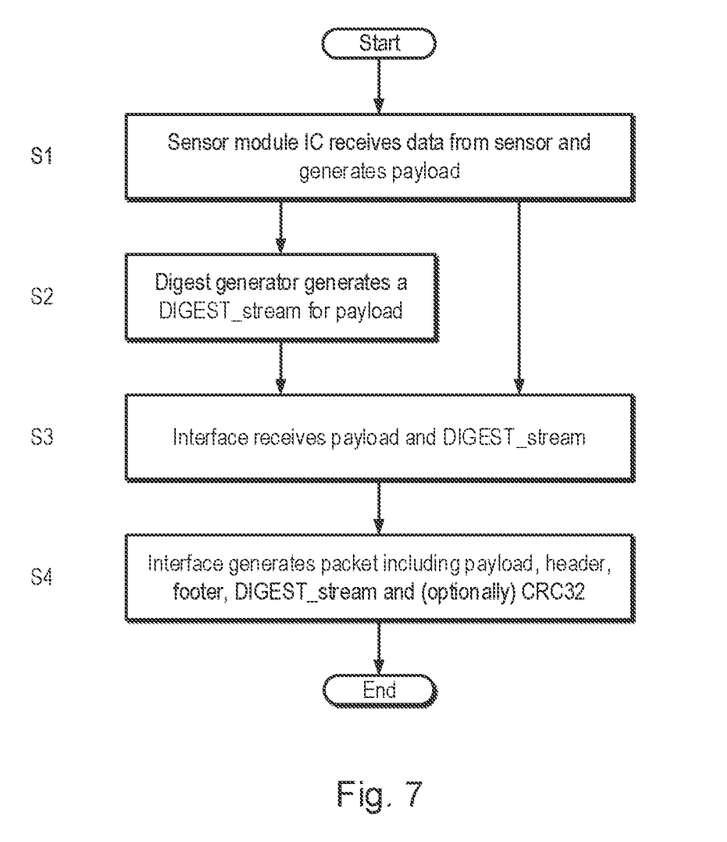
FIG. 7 is a process flow diagram of a method of generating a packet.

Referring to FIG. 7, the sensor module integrated circuit 17 receives a data 19 from sensor 15 and generates a payload 31 containing the data 19 (step S1). The payload 31 is then transmitted to the cryptographic primitive module 22 where a message digest (DIGEST_stream) 33 is generated (step S2). The interface 23 then receives the payload 31 and the DIGEST_stream 33 (step S3). The interface 23 then generates a packet 34 which includes a header 35, the payload 31 which includes the data 19, the DIGEST_stream 33 and a footer 36 (step S4).

Data Validation

Figure 8:
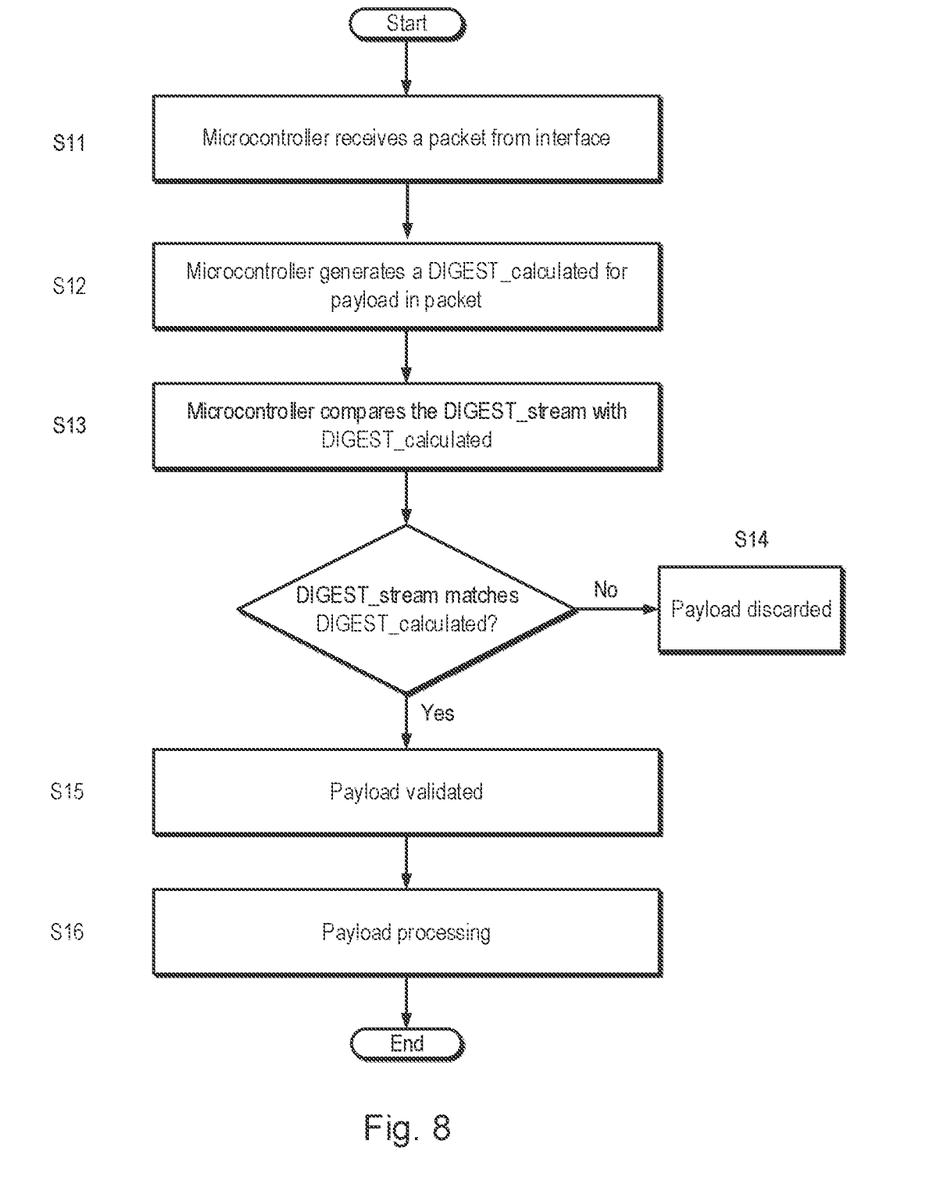
FIG. 8 is a process flow diagram of a method of data validation.

Referring to FIG. 8, the payload 31 is validated before being processed further by the driver assist system 2 to ensure the data 19 in the payload 31 received by the sensor module microcontroller 18 is the same data 19 as the sent to the sensor module integrated circuit 17 by the sensor 15. To validate the payload 31, the microcontroller 18 receives a packet 34 from the interface 23 (step S11). Next, the cryptographic primitive module 34 of the microcontroller 18 generates a message digest (DIGEST_calculated) 41 form the payload 31 (step S12). The generation of the DIGEST_calculated 41 may be performed on the fly as the packet 34 is received. The message digest generator 34 uses the same algorithm to generate the DIGEST_calculated 41 as is used to generate the DIGEST_stream 33 in the sensor module integrated circuit cryptographic primitive module 22. Alternatively, the payload 31 and/or the DIGEST_stream 33 may be stored in system memory 27 to be analysed at a later point. The microcontroller data validation module 39 then compares the DIGEST_stream 33 with the DIGEST_calculated 41 (step S13). If the DIGEST_stream 33 and DIGEST_calculated 41 do not match, the payload 31 is discarded (step S14). If the DIGEST_stream 33 and DIGEST_calculated 41 do match, the payload 31 is validated (step S15). Once the payload 31 is validated, further processing and/or data elaboration can take place (step S16).

Message Digest Function

An example of a message digest function is a hash function. A hash function is used to construct a short digest of a set of data. The digest is smaller in size than the original data, but is capable of identifying a data set without providing details of the contents of the data. It is unlikely that two different sets of data have the same digest.

The hash function is able to map a message of arbitrary finite length L to another message of fixed length $L_d$ where $L_d < L$. For example, the domain of a function may be the content of a memory block (or of the whole array) and the image can be a string of $L_d = 256$ bit.

The hash function may be preimage resistant and/or second preimage resistant and/or collision resistant. Typically, a function that satisfies all of these properties is suitable for use as a hash function for a data integrity check, although different scenarios may have different requirements and priorities. The choice of hash function is based on the degree of resistance for each of preimage attacks, second preimage attacks and its collision resistance. Further, the resources needed for the function may also be used when deciding on the function to use.

The hash function may be the SHA-256 algorithm as defined by the United States of America Department of Commerce Federal Information Processing Standards Secure Hash Standard (SHS) publication FIPS PUB 180-4. A message, M, may have an arbitrary length, and may have a maximum length of $(2^{64}-1)/8$ bytes. The message, M, may be padded to have a length, L, which is a multiple of 256 bits (i.e., the length L may have a multiple of $2^{N_0}$, so that, $L = N \cdot 2^{N_0}$). The message M may be split into multiple blocks, with fixed length $M_1 = M_1 | M_2 | \ldots | M_N$. Each block may be 64 bytes.

An iterative compression function where $H_f = f(M_k, H_{k-1})$ may be implemented to generate the digest.

Modifications

It will be appreciated that various modifications may be made to the embodiments hereinbefore described. Such modifications may involve equivalent and other features which are already known in the design, manufacture and use of error detection systems and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A data transmitter comprising:
an integrated circuit configured to:
in response to receiving a set of data from a data source, generate a digest from the set of data using a cryptographic primitive; and
generate a series of one or more packets carrying the set of data for transmission,
wherein each packet in the series includes a header, the set of data, a footer and the digest, and
wherein the digest is positioned between the footer and the set of data.

2. The data transmitter of claim 1,
wherein the integrated circuit is configured to generate the digest from image and/or range data, as the set of data, the image and/or range data being captured by a sensor as the data source.

3. The data transmitter of claim 1,
wherein the integrated circuit is configured to acquire and quantize data from the data source.

4. The data transmitter of claim 1,
wherein cryptographic primitive is a hash function.

5. The data transmitter of claim 1,
wherein the integrated circuit is configured to:
generate an error-detecting code for each respective packet and to include the error-detecting code in the packet; and
generate the digest from the set of data and the error-detecting code for each respective packet.

6. The data transmitter of claim 1,
wherein the integrated circuit is configured to generate the digest to conform to a Mobile Industry Processor Interface Camera Serial Interface specification.

7. A data receiver comprising:
a microcontroller or a system-on-a-chip configured to:
in response to receiving a series of one or more packets carrying a set of data and a remotely-generated digest of the set of data generated using a cryptographic primitive, where each packet in the series includes a header, the set of data, a footer and the remotely-generated digest positioned between the footer and the set of data, extract the set of data and extract the remotely-generated digest;
generate a locally-generated digest from the set of data using the same cryptographic primitive used to generate the remotely-generated digest; and
compare the remotely-generated digest and the locally-generated digest and signal whether the remotely-generated digest and the locally-generated digest are the same or different so as to indicate an absence or presence respectively of a transmission error.

8. A method comprising:
in response to receiving a set of data from a data source, generating a digest from the set of data using a cryptographic primitive; and
generating a series of one or more packets carrying the set of data for transmission,
wherein each packet in the series includes a header, the set of data, a footer and the digest, and
wherein the digest is positioned between the footer and the set of data.

* * * * *